(12) United States Patent
Ishihara (10) Patent No.: US 7,066,650 B2
(45) Date of Patent: Jun. 27, 2006

(54) LINEAR MOTION GUIDE UNIT

(75) Inventor: Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 99 days.

(21) Appl. No.: 10/878,392

(22) Filed: Jun. 29, 2004

(65) Prior Publication Data

US 2005/0018933 A1    Jan. 27, 2005

(30) Foreign Application Priority Data

Jul. 24, 2003    (JP)    .............................. 2003-278851

(51) Int. Cl.
*F16C 29/06*    (2006.01)

(52) U.S. Cl. ...................................... 384/44

(58) Field of Classification Search .................. 384/44, 384/45, 43; 464/168
See application file for complete search history.

(56) References Cited

FOREIGN PATENT DOCUMENTS

| JP | 2-66313 | 3/1990 |
|---|---|---|
| JP | 7-91446 | 4/1995 |
| JP | 10-68417 | 3/1998 |
| JP | 10-89358 | 4/1998 |
| JP | 2002-54633 | 2/2002 |
| JP | 2002-130272 | 5/2002 |

*Primary Examiner*—Lenard A. Footland
(74) *Attorney, Agent, or Firm*—Browdy and Neimark, PLLC (57) ABSTRACT

A linear motion guide unit is disclosed in which there is provided a retainer band making it possible to easily fit a roller chain with rollers traveling through a recirculation circuit into a load way of the recirculation circuit, thereby making sure of smooth recirculation of the roller chain. Cooperation of the retainer band with a retainer plate helps guide links of the roller chain in a load way of the recirculation circuit, keeping the roller chain against running out of the load way thereby ensuring smooth movement of the roller chain throughout the recirculation circuit.

12 Claims, 10 Drawing Sheets

LINEAR MOTION GUIDE UNIT

FIELD OF THE INVENTION

The present invention relates generally to a linear motion guide unit comprised of a guide rail and a slider that fits over the guide rail for linear movement relative to and along the guide rail by virtue of rolling elements that are allowed to run through a recirculation circuit made in the slider and, more particularly, to a linear motion guide unit of the construction as state earlier, in which the rolling elements fit for rolling motion in the circulation circuit in a way connected with one another through a chain to control their behavior.

BACKGROUND OF THE INVENTION

There is conventionally known a linear motion guide unit having a rolling-element chain in which rolling elements are held in a chain to control the behavior of the rolling elements during the rolling motion through the recirculation circuit. The slider is made therein with a guide trough extending along the overall recirculation circuit to fit therein the chain of the rolling-element chain to make sure of smooth travel of the rolling elements throughout the recirculation circuit. Most conventional linear motion guide units of the construction as stated earlier, nevertheless, have needed several more chores to fit snugly the chain into the guide trough cut in the recirculation circuit. Moreover, accurately cutting the guide trough throughout the recirculation circuit in the slider has been proved to be difficult and complex. With the prior linear motion guide units of the construction as stated earlier, the guide trough made in the recirculation circuit eventually leads the slider to sophistication in construction.

A prior rolling-contact guide system is known as disclosed in, for example Japanese Patent Laid-Open No. 66313/1990 in which a carriage is carried for movement relative to a guide rail. Cassettes are secured to both sides of the carriage, one to each side, using fastening bolts to guide a sort of chain composed of a retainer element keeping therein rolling elements including rollers, balls, and so on. The cassettes are composed of shapes of metal sheets, which are fastened to the both sides of the carriage with screws in such a manner that the retainer element fits at the guide shoulder thereof into a guide trough that is formed in the shape of metal sheet. With the rolling-contact guide system constructed as stated just earlier, the retainer element, once assembled into the cassette, is very tough to take it apart out of the cassette.

Another example of the conventional rolling-contact. guide system is disclosed in, for example Japanese Patent Laid-Open No. 68417/1998 in which a carriage is carried for movement along a guide rail through rolling elements including balls, and so on, which fit in a recirculation passage with being kept with an endless retainer. A retainer holder is provided along a side edge of a load raceway groove cut in a carriage body to keep a side of the endless retainer along the load race. The retainer holder is of a resin molding that is made integral with the carriage body high in rigidity. With the rolling-contact guide system constructed as stated earlier, the retainer used to space the rolling elements from each other is installed in a guide trough cut deep throughout the recirculation passage.

With the prior linear motion guide unit disclosed in, for example Japanese Patent Laid-Open No. 89358/1998, a carriage is carried for linear movement along a guide rail through rolling elements or balls, which are kept in place with a chain to make sure of smooth recirculation. The carriage is provided on any side thereof with a fore-and aft raceway groove to make a load race. A ball retainer fits in the side edge of the load race made in the carriage to make engagement with the rolling elements, keeping the rolling elements against coming apart away from one another after the carriage has been disengaged out of the guide rail. The ball retainer is made with a guide construction in the form of a guide trough into which the chain fits on a lengthwise edge thereof for relatively linear movement. For installation of the ball chain into the linear motion guide unit, the carriage is first dismantled of any one of forward and aft end caps to open both the load passage and non-loaded return passage. The carriage is placed upright with facing the open end straight up. The chain is applied to the open end of the non-loaded return passage, followed by being fed into the return passage together with the balls by the use of an intermittent-feed mechanism. After having finished charging the ball chain into the carriage, the end cap is applied to complete the recirculation circuit. Moreover, ball pockets in the chain is so made as to allow the ball making easy engagement with and/or disengagement out of the chain for making certain of smooth assemblage of the ball chain in the carriage.

Disclosed in, for example Japanese Patent Laid-Open No. 54633/2002 is a further another linear motion guide unit, which is comprised of a guide rail having two rows of lengthwise races on widthwise opposite sides thereof, two races to each side, and a carriage carried for linear motion relative to the guide rail by virtue of many rollers, which are held with a roller retainer while allowed to roll through their associated recirculation circuit. A guide member is provided in a way extending along the lengthwise side edges of the load race to form a guide trough to guide the rollers along there. The guide member is composed of first, second and third parts, which are made of resinous material, molded separately from the carriage body. The first part has at forward and aft ends thereof tenons to fit into the end caps, and also has at a lengthwise side thereof elongated openings used to fasten it in place relative to a radially inside guide component. The second part is made at forward and aft ends thereof with tenons to fit into the radially inside guide components. The third part, like the first part stated earlier, has at forward and aft ends thereof tenons to fit into the end caps, and also has at a lengthwise side thereof elongated openings used to fasten it in place relative to a radially inside guide component. On assembling the members, parts, components, and so on stated earlier into the linear motion guide unit, one of the end caps is first mounted to any one lengthwise end of the carriage body and then the first, second and third parts are installed in the carriage body. A retainer band together with the rollers is inserted through the opposing opened end of the carriage body into the recirculation passage. The radially outside and radially inside guide components are attached to the opened end of the carriage body, followed by covered with the associated end cap.

Further disclosed in, for example Japanese Patent Laid-Open No. 130272/2002, which is a co-pending senior patent application, is another example of the linear motion guide unit, in which many separators are sequentially held with a chain in a way spaced away from each other. The slider has a retainer band to keep the rolling elements against coming apart away from one another and also the chain against falling away from the slider after the carriage has been disengaged out of the guide rail. The slider is made with a deep slot to allow the retainer band receding into the deep slot so as to make disengagement with the chain in a phase where the slider is in association with the guide rail.

In Japanese Patent Laid-Open No. 91446/1995, which is a co-pending senior patent application, there is disclosed a linear motion guide unit in which two rows of sequential rollers roll through recirculation circuits in a way intersecting with each other at their turnarounds. A retainer plate is secured to a carriage of a slider by means of a fastening band, which makes engagement with end caps of the slider. With the linear motion guide unit constructed as stated earlier, any adjacent rollers are in direct rolling-contact with one another and the retainer plate has no guide trough.

The prior linear motion guide units stated earlier, nevertheless, pose different issues as will be discussed below.

With the first prior rolling-contact guide system cited above, the carriage is made with subdivisions for the provision of the guide trough where the guide shoulder of the retainer element is allowed to move through there. Thus, the guide system would be less in stiffness. Moreover, since the recirculation circuits are made throughout with using the shapes of metal sheet, the guide system has to be made inevitably on a large scale in the overall construction as well as needs several more chores of finishing the recirculation circuits.

The rolling-contact guide system disclosed in the second citation needs to make integrally retainer holders to provide the recirculation circuits for the ball-retainer combination. The intricate configuration would require sophisticated skill and also complicated work to complete it. Moreover, it would be much troublesome to fit snugly the ball-retainer combination into the guide trough, which has been completed in advance throughout the recirculation circuit.

The third prior linear motion guide unit cited earlier, because the ball retainer is fastened to the carriage body, needs the complex process of combining the balls with the chain prior to introduction of the ball chain into the recirculation circuit in the linear motion guide unit. Moreover, there is the possibility that any ball could unexpectedly fall away out of the chain before charging the ball chain.

With the fourth prior linear motion guide unit cited above, the first, second and third parts must all be set up together relatively to their associated radially inside guide components and end caps to finish the linear motion guide unit. This gets assembling work harder. Moreover, the sophisticated configuration in section of the parts for the guide member may make assembling and production work much troublesome.

Thus, the linear motion guide unit in which the rolling-element chain is assembled into the recirculation circuit in the slider still poses the major challenges about how to make a guide trough with accuracy and ease in the recirculation circuit, how to form the guide trough with using a member simple in shape and how to make the application of the rolling-element chain into the recirculation circuit easier.

SUMMARY OF THE INVENTION

The present invention, therefore, has as its primary object to provide a linear motion guide unit in which a rolling-element chain having successive rollers held in either held and/or non-held condition is fit for rolling movement through a circulation circuit, and in particular to provide a linear motion guide unit in which a specific construction to guide the rolling-element chain may be made with better accuracy by the use of any simple member, while the rolling-element chain can be installed with ease in the recirculation circuit. The rolling-element chain recited hereinafter refers to a combination of rollers or balls for rolling elements with retainers to keep the rolling elements against collision with one another, the retainers being comprised of separators each disposed between any two adjoining rolling elements to space them away from each other in close alignment, and links to joining successively the separators. Moreover, the rolling-element chain is referred to as ball chain when a rolling element is a ball, while as roller chain when a rolling element is a roller.

The present invention is concerned with a linear motion guide unit comprising; an elongated guide rail, a slider arranged on the guide rail for movement relative to the guide rail, a rolling element rolling through a recirculation circuit made in the slider, a rolling-element chain allowed to travel together with the rolling element through the recirculation circuit, and a first retainer band to guide the rolling-element chain along a load area in the recirculation circuit defined between the guide rail and the slider while keeping the rolling-element chain against running out of line; and wherein the first retainer,band is installed in the slider in a detachable way allowing the rolling-element chain to fit it into the recirculation circuit from the load area of the recirculation circuit.

In another aspect of the present invention, a linear motion guide unit is disclosed in which the rolling-element chain is comprised of a retainer including a separator interposed between any two adjoining rolling elements to keep the adjoining rolling elements against rolling contact with one another while keeping the rolling elements against running out of line and a set of parallel resilient links interconnecting in series the adjoining separators with one another, and the rolling element fit in an opening defined by both the adjoining separators and the links interconnecting the separators of the retainer.

In another aspect of the present invention, a linear motion guide unit is disclosed in which the slider is composed of a carriage having a race to form the load area together with a race of the guide rail between them, and a return passage to return the rolling element from any one of forward and aft ends of the load area back to other end, and end caps secured to forward and aft ends of the carriage, one to each end, and made therein with turnarounds where the rolling-element chain is allowed to turn about in rolling direction, and wherein the recirculation circuit is make up of the load area, return passage and turnaround.

In another aspect of the present invention, a linear motion guide unit is disclosed in which the retainer band is made of a metal strip bent to a specific shape, which includes a major retainer part to guide the link to keep it against running out of line, lengthwise opposite ends of the major retainer part bent to make engagement with slots cut in end surfaces of the end caps, and hooked toes at the extremities of the bent ends to come into engagement with dents cut in sides of the end caps.

In an additional aspect of the present invention, a linear motion guide unit is disclosed in which one of the parallel links of the rolling-element chain fits for traveling in a guide trough that is defined in the load area of the recirculation circuit between the retainer band and a guide shoulder cut in the carriage, while another of the parallel links of the rolling-element chain fits for traveling in another guide trough that is cut in a retainer plate secured to the carriage.

In another aspect of the present invention, a linear motion guide unit is disclosed in which the return passage of the recirculation circuit in the carriage is formed within a sleeve installed in a bore in the carriage, the sleeve having a guide slot cut deep to allow the link of the roller chain to move along there.

In another aspect of the present invention, a linear motion guide unit is disclosed in which the recirculation circuits are arranged on sidewise paired side blocks of the carriage, two rows for each side, the two rows of the recirculation circuits being oriented to intersect each other, and the slots to make engagement with the retainer band are cut in the end surfaces of the end caps in a way that they are different in depth and crossed each other.

In another aspect of the present invention, a linear motion guide unit is disclosed in which the rolling-element chains are roller chains in which rolling elements are rollers, the roller chains being installed in the two rows of the recirculation circuits, one to each row.

In another aspect of the present invention, a linear motion guide unit is disclosed in which the retainer plate has a wedge on a surface thereof facing the carriage, a recess on a surface thereof opposite to the wedged surface, and a bore to allow a fastening bolt extend through there after having extended through a bolt hole in the carriage, the wedge being adapted to fit into a V-groove cut in any one side block of the carriage between two rows of the circulation circuits, the recess being adapted to accommodate therein a backup plate with a threaded hole, whereby the retainer plate is secured to the carriage by fitting the wedge into the V-groove, followed by screwing the fastening bolt into the threaded hole in the backup plate.

In a further another aspect of the present invention, a linear motion guide unit is disclosed in which the retainer plate has a wedge on a surface thereof facing the carriage, a recess on a surface thereof opposite to the wedged surface, the wedge being adapted to fit into a V-groove cut in any one side block of the carriage between two rows of the circulation circuits, and wherein a fastener band is provided to fit into the recess with lengthwise opposite ends thereof coming into engagement with the forward and aft end caps whereby the retainer plate is secured to the carriage. Moreover, the fastener band is composed of a major part to bear the retainer plate thereon, forward and aft ends bent to make engagement with concaves cut in the end caps, and hooked extremities to fit into depressions cut in sides of the end caps, the concaves in the end cap being made more in depth than the slots that are cut to accommodate the retainer band, which is to keep the one of the parallel links of the rolling-element chain against running out of line.

In another aspect of the present invention, a linear motion guide unit is disclosed in which the retainer plate has lengthwise guide surfaces to guide any axial ends of the rollers in the recirculation circuits, the guide surfaces being made therein with guide troughs for carrying another of the parallel links of the roller chain.

With the linear motion guide unit of the present invention constructed as stated earlier, in which the rolling-element chain is kept with the retainer band at the load race area of the recirculation circuit in the slider, the construction to guide the rolling-element chain is allowed to run through there can be made accurately by any simple member. The rolling-element chain, once assembled into the circulation circuit, may be kept easily in the load area of the circulation circuit by the action of the retainer band. The rolling-element chain is easier to assemble it into the slider and also detach it out of the slider for replacement. According to the present invention, especially, the rolling-element chain is allowed to fit into the recirculation circuit from the side of the load way of the slider and also guided smoothly in a sliding way along the recirculation circuit in the slider.

DETAILED DESCRIPTION OF THE PREFERRED EMBODIMENTS

The linear motion guide unit of the present invention is expected for the application between two machine members that move or travel relative to one another in diverse machines including, for example semiconductor manufacturing machines, precision measuring instruments, precision inspection instruments, precision assembly machines, and so on.

Figure 1:
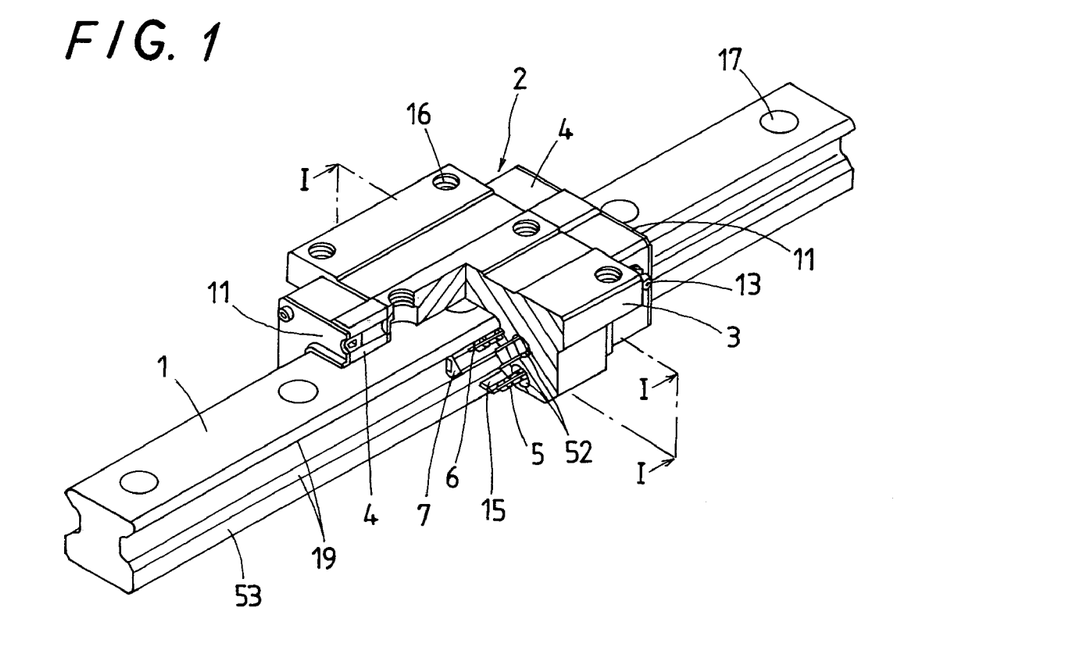
FIG. 1 is a perspective view, partially broken away, showing a preferred embodiment of a linear motion guide unit according to the present invention, in which a rolling-element chain used therein is a roller chain.
Figure 2:
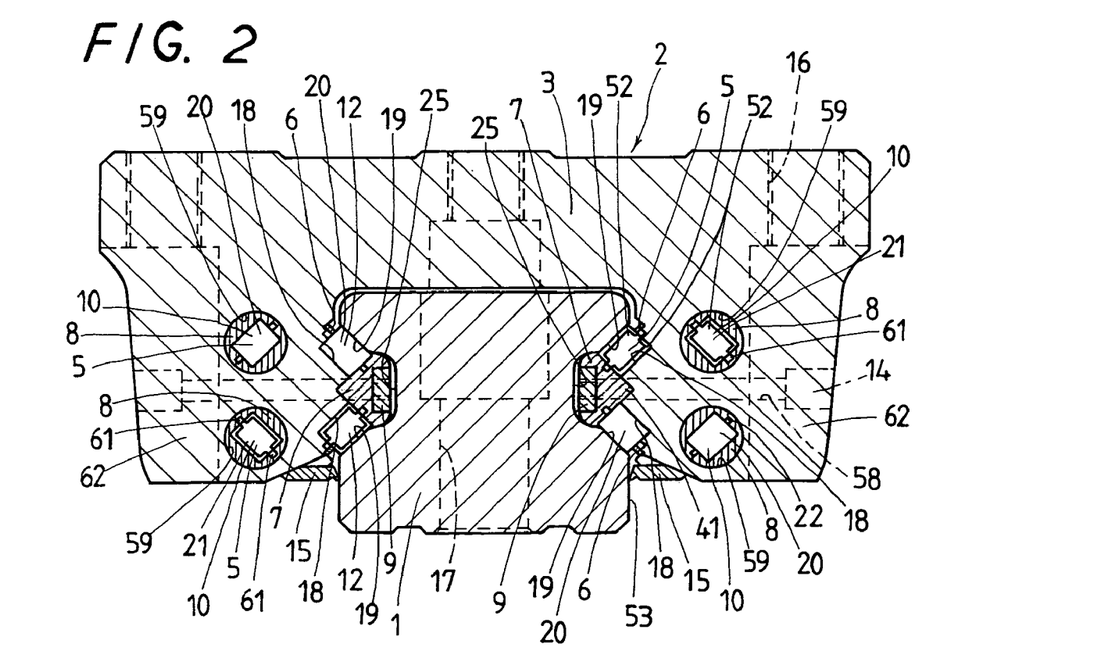
FIG. 2 is a traverse cross-sectional view of the linear motion guide unit shown in FIG. 1 and taken on the plane of the line I—I of that figure.

Referring now to FIGS. 1 and 2, there is shown a linear motion guide unit according to the present invention, in which a rolling-element chain is incorporated therein. Although but the rolling-element chain in the illustrative embodiment is recited as being a roller chain 5 in which a roller: one of the two members of the class of rolling elements is held in a chain, it will be appreciated that the rollers may be replaced by balls for another version of the linear motion guide unit modified to use a ball chain in which a ball: other member of the class of rolling elements is kept in the chain.

The linear motion guide unit of the present invention, as shown in FIG. 1, is mainly comprised of an elongated guide rail 1, and a slider 2 that fits over and conforms to the guide rail 1 for sliding movement by virtue of rolling elements of rollers 20. The guide rail 1 has lengthwise sides 53 where there are formed longitudinal grooves 25, one to each side, which define therein two rows of races 19 tilting in opposite direction to grow farther apart as they splay out. The longitudinal groove 25 is designed to fit a retainer plate 7 therein. The guide rail 1, moreover, has holes 17, which are used to fasten the guide rail 1 to a stationary member, not shown, including machine bed and other machinery.

The slider 2 is mainly comprised of a carriage 3, end caps 4 mounted on forward and aft ends of the carriage 3, one to each end, and end seals 11 attached on the end surfaces of the end caps 3. A bottom seal 15 is mounted underneath the slider 2. The slider 2 includes side blocks 62 that are arranged to embrace the guide rail 1 between them and made on inside surfaces thereof with two rows of races 18 in opposition to their associated races 19 on the guide rail 1. The side blocks 62 of the slider 2 each has two rows of return passages 10, which are formed in correspondence to the races 18, one to each race. The carriage 3 is also made with holes 16, which are used to fasten the slider 2 to other moving part, equipment and the like, not shown. The return passage 10 in the carriage 3 is formed within a sleeve 8 installed in a bore 59 in the carriage 3. The sleeve 8 has guide troughs 61 cut deep to allow links 22 of the roller chain 5 to move along there.

Figure 6:
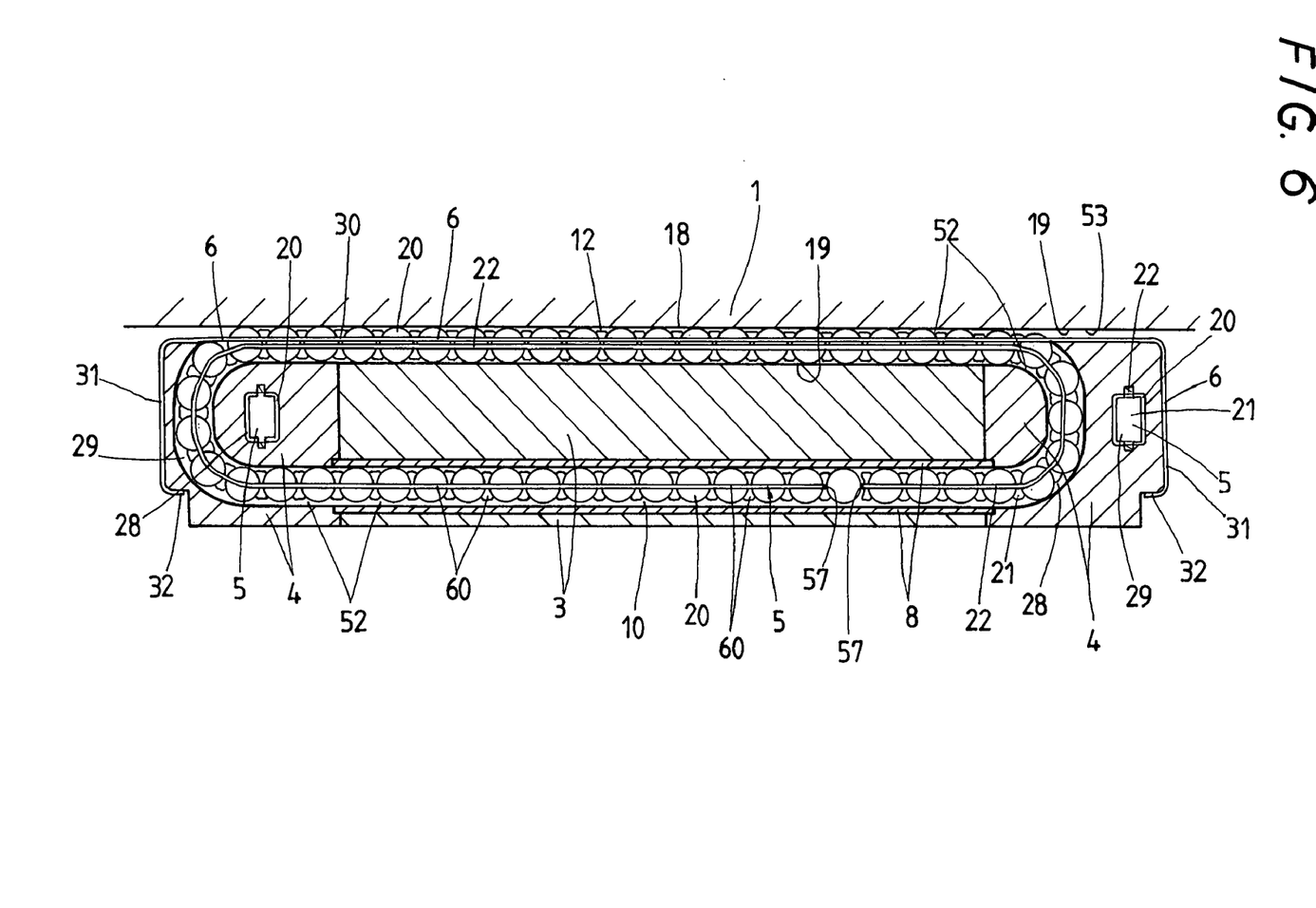
FIG. 6 is a longitudinal section explanatory of a recirculation circuit in the linear motion guide unit of FIG. 1.
Figure 9:
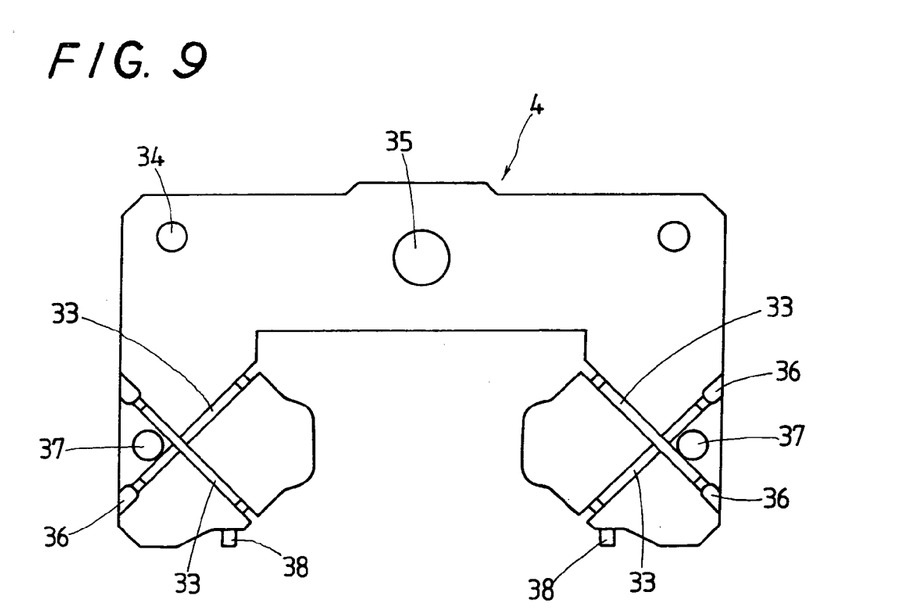
FIG. 9 is a front elevation of an end cap to be assembled in the linear motion guide unit of FIG. 1.
Figure 10:
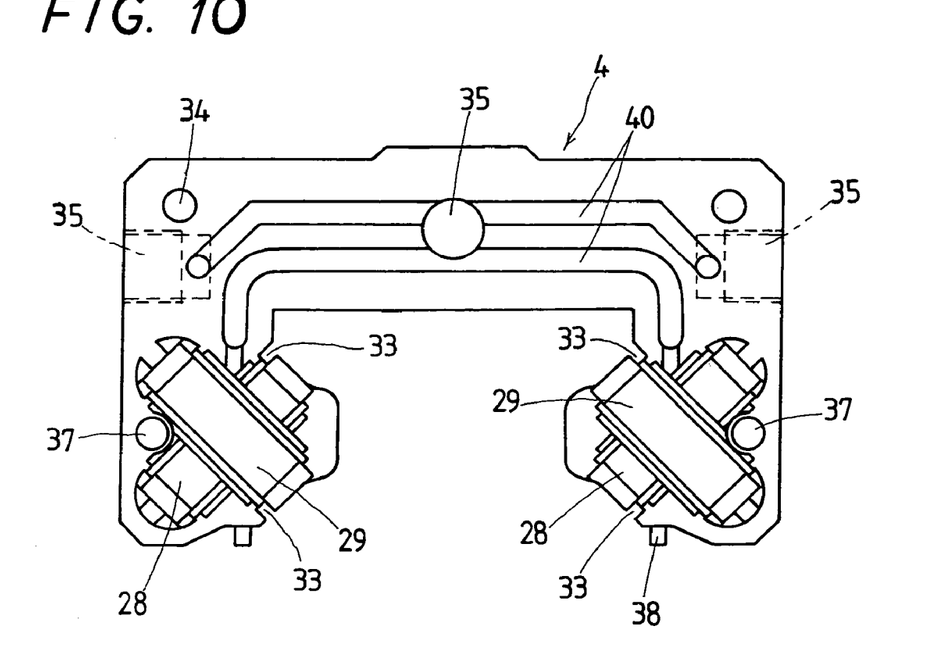
FIG. 10 is a rear view of the end cap in FIG. 9.

The end caps 4 are each provided with turnarounds 28, 29 shown in detail in FIG. 6, where the rollers 20 moving through the recirculation circuits 52 are allowed to turn around in their traveling direction. The turnarounds 28, 29 are disposed in such a relation intersecting each other, with any one 28 of them being more radially inside than the other 29. The end cap 4, as shown in FIGS. 9 and 10, is made at either any side or front thereof with a threaded opening 35 into which a grease nipple 13 fits to feed lubricant into recirculation circuits 52. The end cap 4 is also provided therein with lubricant paths 40 where the lubricant charged through the grease nipple 13 coupled to the threaded opening 35 is applied to the recirculation circuits 52, bolt holes 37 used to fasten the end cap 4 to the carriage 3, and lugs 38 used to engage the bottom seals 15 with the carriage 3. Slots 33 used to fasten retainer bands 6 at their forward and aft ends to the end caps 4 are cut in the outside end surfaces of the end caps 4 in such a relation intersecting each other, with any one of them being cut deeper than the other. The slots 33 terminate in dents 36 used to tie hooked toes of the retainer bands 6 to the end caps 4.

The recirculation circuits 52 lying on the opposite sides of the guide rail 1 include a pair of load ways 12 defined between the two-row race 19 on the sides of the guide rail 1 and the two-row race 18 on the carriage 3, the turnarounds 28, 29 formed in the forward and aft end caps 4, and the return passages 10 extending lengthwise through the carriage 3. The roller chains 5 composed of many rollers 20 for the rolling elements and retainers 60 keeping the rollers 20 at regular intervals may travel through the recirculation circuits 52, which include the load ways 12, the return passages 10 and the turnarounds 28, 29 intersecting each other, where the roller chains 5 are allowed to turn about from the load ways 12 to the return passages 10, and vice versa.

Figure 3:
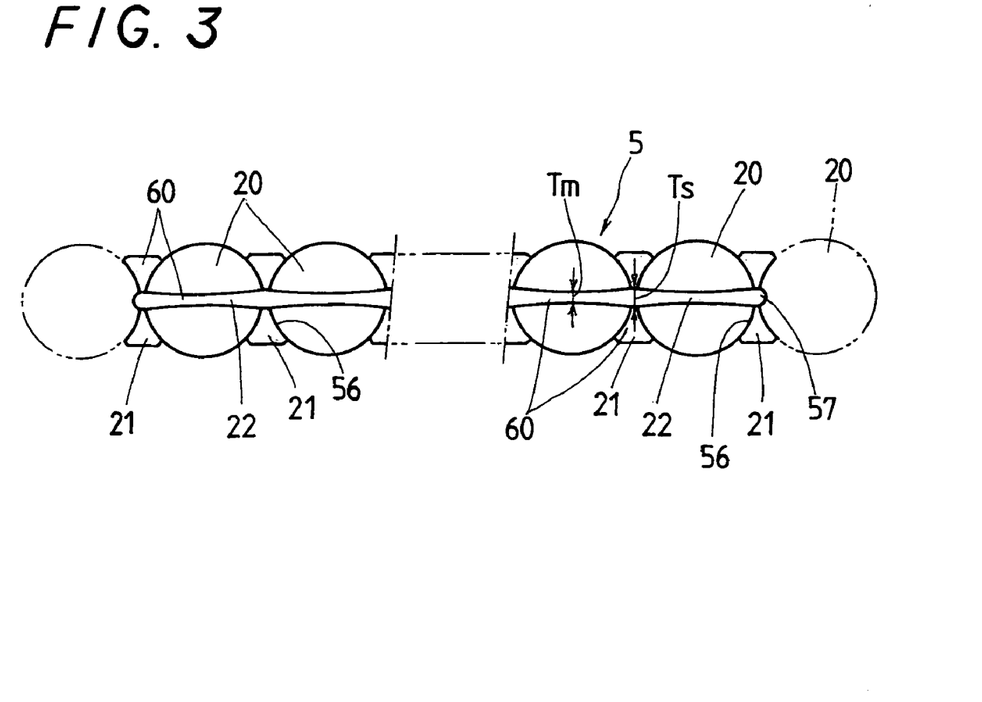
FIG. 3 is a front elevation, partially cutaway, showing the roller chain in the straight position, which is to be assembled into the linear motion guide unit of FIG. 1.
Figure 4:
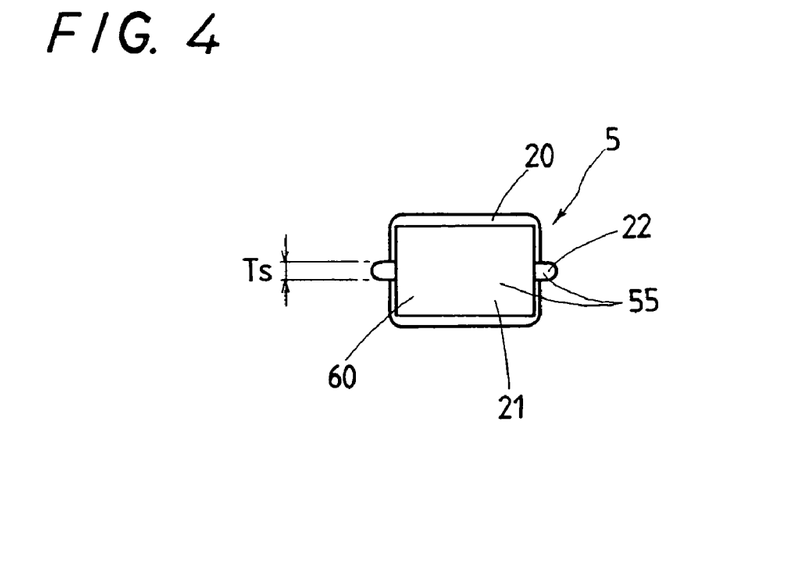
FIG. 4 is an end elevation of the roller chain of FIG. 3.

The roller chain 5, as shown in FIGS. 3 and 4, is comprised of the rollers 20 and a series of the retainer links 60 interconnected to carry the rollers 20 at intervals. The overall length of the interconnected retainer links 60 is short by one roller, so that confronting extremities 57 of the interconnected links 60 installed in the recirculation circuit 52 are separated from one another by a distance of a single roller 20. The interconnected retainer links 60 consists of separators 21 interposed between any two adjoining rollers 20 to keep the adjoining rollers 20 against rolling contact or collision with one another while keeping the rollers 20 against running out of line, and resilient links 22 extending over axially opposite circular ends of the roller 20 across substantially the centre of the roller 20 in parallel with each other while interconnecting in series the separators 21 with one another. The separators 21 each have forward and aft end surfaces facing their adjacent rollers 20, which are made concave 56 to fit over and conform to their associated rollers 20 in rolling-contact relation. It will be thus understood that the rollers 20 are held in pockets, each of which is defined by the opposite concaves 56 of the separators 21 placed next to each other and the opposing parallel links 22. The links 60, as shown in FIG. 3, are each made somewhat less in thickness Tm at an area parallel to the centre of the roller 20, compared with the thickness Ts at an area to which the separator 21 is jointed. This lengthwise variation in thickness of the link 22 helps make the links 22 more resilient.

In the linear motion guide unit comprised of the elongated guide rail 1, the slider 2 traveling relatively to the guide rail 1 by virtue of the rollers 20 installed for rolling motion through the recirculation circuits 52 in the slider 2, especially, the improvement of the present invention features that the roller chain 5 having successive rollers 20 is fit for rolling movement through the associated circulation circuit 52 in held and/or non-held condition including such condition as being held with any pawls, and the retainer band 6 is installed detachably in the slider 2 to guide accurately the roller chain 5 throughout the recirculation circuit 52 while keeping the roller chain 5 against running out of the load way 12 defined between the guide rail 1 and the slider 2 during the travel through the recirculation circuit 52, thereby allowing the roller chain 5 to fit in the recirculation circuit 52 from the side of the load way 12 of the slider 2. The retainer bands 6 are installed in the side blocks 62 of the carriage 3, two rows to each side block.

Figure 5:
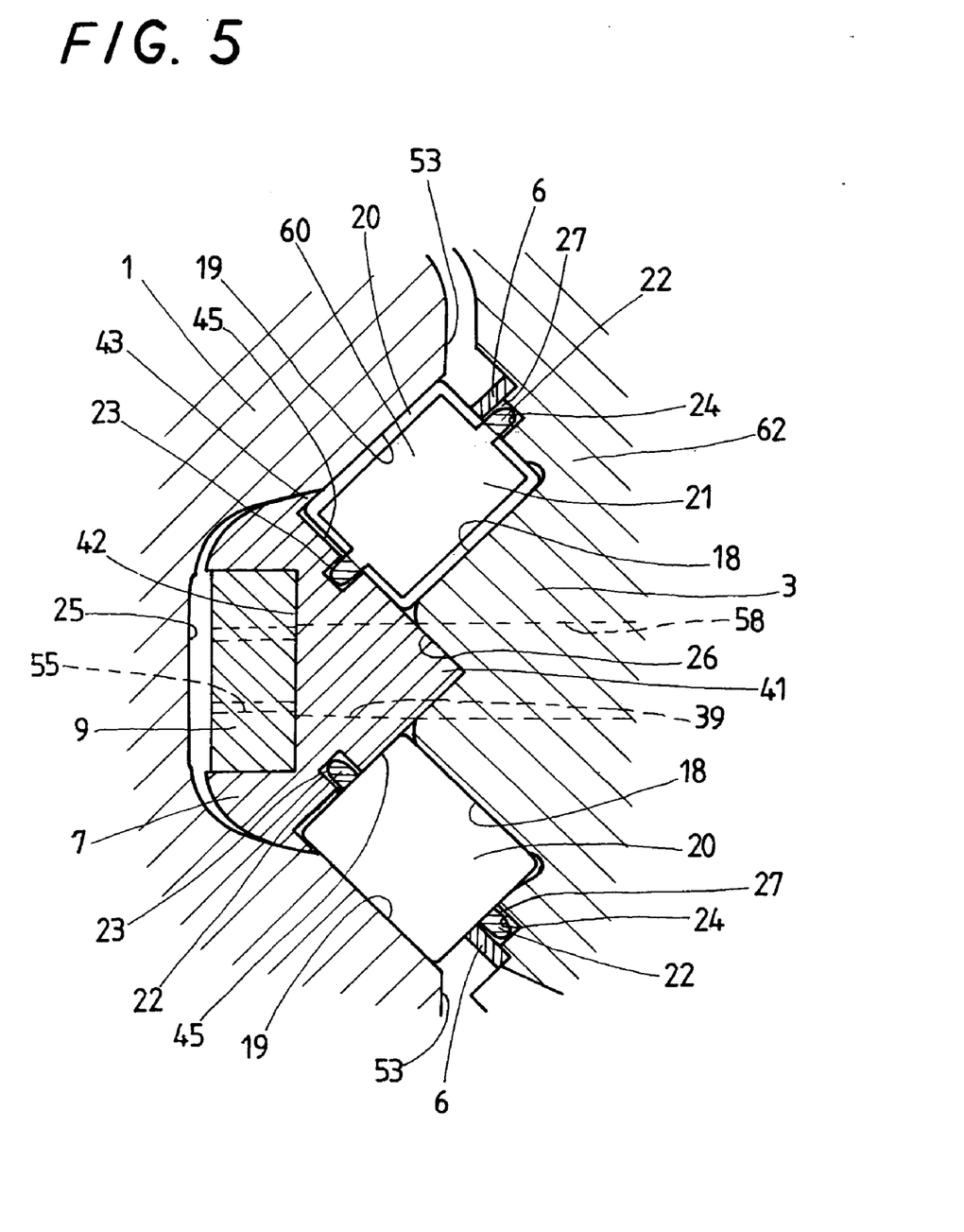
FIG. 5 is an enlarged fragmentary section showing a preferred embodiment of a race construction in the linear motion guide unit of FIG. 2.
Figure 7:
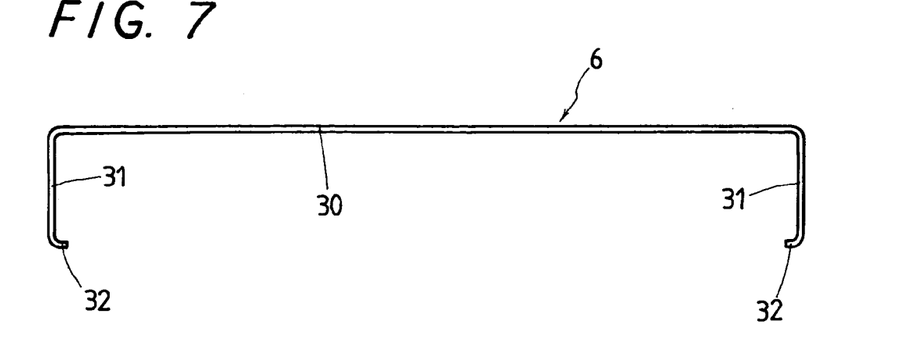
FIG. 7 is a front elevation showing a retainer band adapted to work together with a guide shoulder in a carriage in the linear motion guide unit of FIG. 1, defining a guide trough between them to guide the roller chain through there.
Figure 8:
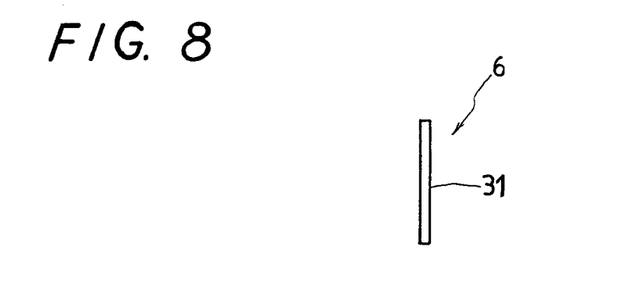
FIG. 8 is an end view of the retainer band shown in FIG. 7.

With the linear motion guide unit constructed as in FIG. 5, a longitudinal side associated with the race 18 in the carriage 3 is cut deep to form a guide shoulder 24, which may work in concert with the retainer band 6 to define a guide trough 27 where the roller chain 5 is allowed to travel in the carriage 3 without running out of line by keeping the links 22 in place with the retainer band 6. The guide shoulder 24 may be machined together with the race 18 at once in the carriage 3. The guide shoulder 24 helps ensure accurate guidance of the links 22 of the roller chain 5 throughout the recirculation circuit 52. Just forcing simple metal strip of material easy for bending into a desired shape can shape the retainer band 6 as in FIGS. 7 and 8. The roller chain 5 in the linear motion guide unit of the present invention may travel on the load way 12 of the recirculation circuit 52 in a way any one of the paired parallel links 22 fits for sliding movement in the guide trough 27 in the carriage 3 while another link 22 fits in another guide trough 23 cut in the retainer plate 7, which is secured to the carriage 3.

With the linear motion guide unit in which two rows of roller chains 5 are arranged on opposite sides of the guide rail 1, any one row of the roller chains 5 rolls through the upper load way 12 defined between the race 18 on the guide rail 1 and the race 19 in the slider 2, followed by running downward through the turnaround 29 in any one of forward and aft end caps 4 into the obliquely lower return passage 10, and then getting back to the load way 12 through the turnaround 28 in the other end cap 4. The roller chain 5 on the other row runs past through the lower load way 12, followed by running upward through the turnaround 28 in any one of forward and aft end caps 4 into the obliquely upper return passage 10, and then entering back to the load way 12 through the turnaround 29 in the other end cap 4.

The end caps 4, as shown in FIG. 6, are each made therein with two types of the turnarounds 28, 29 with any one type being more radially inside than another. With the linear motion guide unit constructed as stated earlier, any one recirculation circuit 52 includes the radially inside turnaround 28 at any one end cap 4 and the radially outside turnaround 29 at the other end cap 4, while the other recirculation circuit 52 includes the radially outside turnaround 29 at any one end cap 4 and the radially inside turnaround 28 at the other end cap 4. The recirculation circuits 52 intersect each other at the areas of the turnarounds 28, 29. That is to say, two rows of the recirculation circuits 52 are made in any one side of the slider 2, with any one extending upward over another at any one of end caps 4 and downward below another at the other end cap 4.

The retainer band 6 as illustrated in FIG. 6 is applied to the slider 2, with lengthwise opposite ends thereof making engagement with the end caps 4. The retainer band 6 is made of a metal strip bent to a specific shape as in FIGS. 7 and 8, which includes a major retainer part 30 to keep the roller chain 5 against running out of line, lengthwise opposite ends 31 of the major retainer part 30 bent to make engagement with the end caps 4, and hooked toes 32 at the extremities of the bent ends 31.

Figure 11:
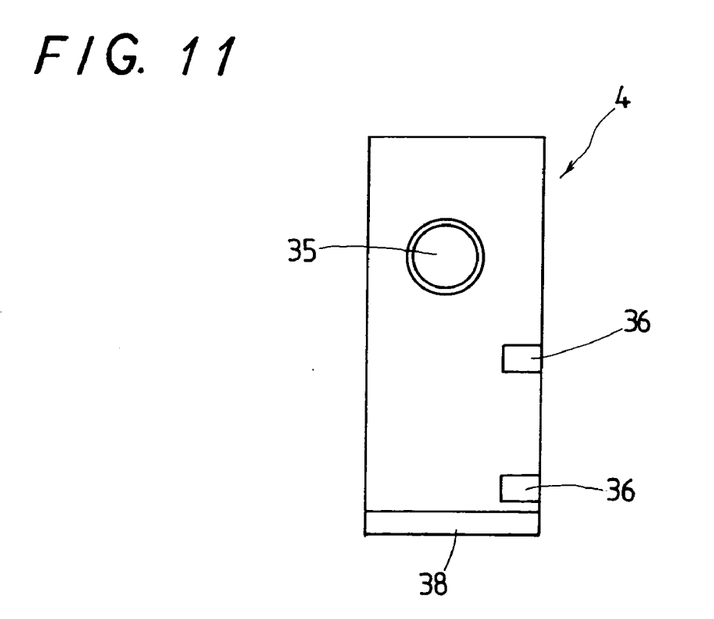
FIG. 11 is a side elevation of the end cap shown in FIG. 10.

As shown in FIGS. 9 to 11, any one of the lengthwise opposite ends 31 of the retainer band 6 fits in the associated slot 33 cut in any one of the end caps 4 while the hooked toe 32 comes into engagement with the dent 36 in the end cap 4. Another end 31 of the retainer band 6 fits in the associated slot 33 cut in another end caps 4 while another hooked toe 32 comes into engagement with the dent 36 in another end cap 4. The slots 33, as seen in FIG. 9, are cut in the outside end surfaces of the end caps 4 in such a relation that they intersect one another, with any one of them being cut deeper than the other. The slots 33 different in depth lie in crossing relations differing from one another in opposite sides of the end cap 4 when viewed from the front. According to the layout of the slots 33 designed as stated earlier, just one class of the retainer band 6 standardized in length is interchangeable for different slots 33. This makes it possible to standardize the part design, regardless of whether the slots 33 are shallow or deep.

The paired retainer bands 6 applied to any one side block 62 of the carriage 3 fits in the slots 33, one to each slot, made different in depths on the outside end surface of any one of the end caps 4 secured on the associated end of the carriage 3 while another paired retainer bands 6 applied to another side block 62 of the carriage 3 fits in the slots 33 made in different depths, one to each slot, on the outside end surface of the same end caps 4 secured on the associated end of the carriage 3. On another end cap 4 secured to another end lengthwise opposite to the first end of the carriage 3, the paired retainer bands 6 also fit in the slots 33 different in depth, one to each slot, in a mating relation reversing to the band-to-slot mating on the first end cap 4. In other words, four retainer bands 6 are all identical in length, and any one retainer band 6 mated with the deep slot 33 on any one end cap 4 fits in the shallow slot 33 on another end cap 4 while another retainer band 6 mated with the shallow slot 33 on the first end cap 4 fits in the deep slot 33 on another end cap 4.

Embodiment 1

With the linear motion guide unit of the first embodiment constructed as in FIGS. 2 to 13, the retainer plate 7 for keeping the rollers 20 is secured to the carriage 3 of the slider 2 with using fastening bolts 14. The retainer plate 7 extends in the fore-and-aft direction of the carriage 3 and has lengthwise guide surfaces 45, which come into sliding contact with any axial ends of the rollers 20 to carry axially them for rolling through the load races 12 of the recirculation circuits 52. The retainer plate 7 is also made on the guide surfaces 45 thereof with guide troughs 23, one to each guide surface, for carrying the links 22 of the roller chains 5. The retainer plate 7 is made on the back thereof with a recess 42 to receive therein a backup plate 9 having threaded holes 55. The retainer plate 7 is further bored at 39 between upper and lower guide surfaces 45 extending in parallel with one another. The recess 42 cut in the retainer plate 7 has a depth somewhat more than the thickness of the backup plate 9 for easy setup of the backup plate 9 having threaded holes 55. The backup plate 9 has about the same length as the retainer plate 7. The carriage 3 is clamped together with the retainer plate 7 with the fastening bolts 14, which fit into the threaded holes 55 in the backup plate 9 on the back of the retainer plate 7, after extending through the bores 39 in the retainer plate 7 and bolt holes 58 in the carriage 3.

With the linear motion guide unit stated just earlier, the roller chain 5 as shown in FIGS. 2, 5 and 6 is carried between the retainer band 6 and the retainer plate 7 during traveling through the recirculation circuits 52. The retainer band 6 assembled in the slider 2 guides the roller chain 5 while keeping the roller chain 5 against running out of line, and also helps easy assembly and detachment of the roller chain 5 out of the recirculation circuits 52 in the slider 2.

The guide shoulder 24 for carrying the links 22 of the roller chain 5 thereon is cut into the longitudinal side associated with the race 18 in the carriage 3. The retainer band 6 is applied to cover the guide shoulder 24 to thereby define the guide trough 27 between them. One of parallel sets of the links 22 in the roller chain 5 is guided by the guide trough 27 while another set of the links 22 in the roller chain 5 is guide along the guide trough 23 in the retainer plate 7. The retainer bands 6 are applied for both the upper and lower races 18 in so symmetry as to act in the same way. The guide shoulders 24, because it is possible to make them together with a lengthwise V-groove 26 in a single machining operation, can be cut with high precision.

Figure 12:
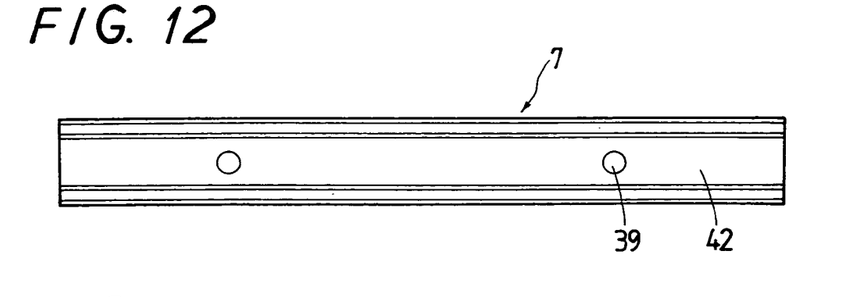
FIG. 12 is a front elevation of a retainer plate to be held in the linear motion guide unit of FIG. 1.
Figure 13:
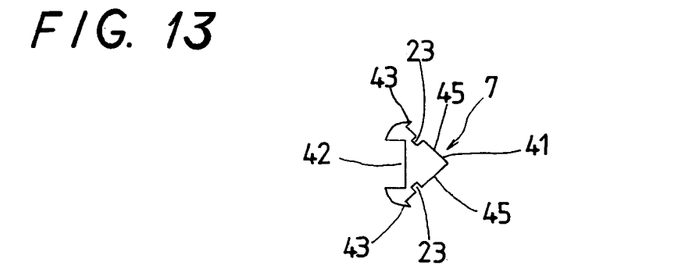
FIG. 13 is an end view of the retainer plate of FIG. 12.
Figure 14:
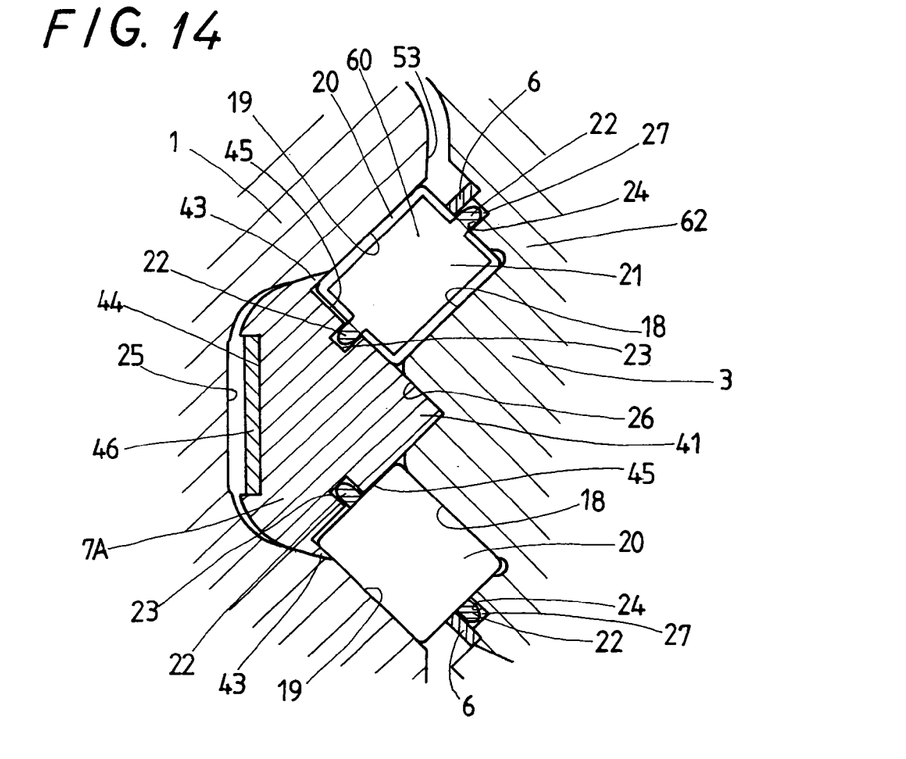
FIG. 14 is an enlarged fragmentary section corresponding to FIG. 5 to illustrate another embodiment of a race construction in the linear motion guide unit according to the present invention.

The retainer plate 7, as shown in FIGS. 12 and 13, has lengthwise guide surfaces 45, which come into sliding contact with any axial ends of the rollers 20 to carry axially them for rolling through the load races 12 of the recirculation circuits 52. In the guide surfaces 45, there are made the guide troughs 23, one to each guide surface, in which the links 22 of the roller chain 5 fit to be kept against running on the skew. The retainer plate 7, moreover, is provided with pawls 43 to keep the rollers 20 against running out of line. With the embodiment discussed now, however, the pawls 43 need not to be provided because the rollers 20 are retained with the retainer links 60. As seen in FIGS. 2 and 5, the retainer plate 7 may be secured to the carriage 3 by fitting a wedge 41 thereof into the V-groove 26 cut in the carriage 3, followed by screwing the fastening bolts 14 from the side of the carriage 3 into the threaded holes 55 in the backup plate 9.

Embodiment 2

With the second embodiment as in FIGS. 14 to 21, the first embodiment constructed as stated earlier is modified by replacing the backup plate 9 with a fastener band 46 to secure a retainer plate 7A to end caps 4A. The modified linear motion guide unit has not to use the fastening bolts applied from the outside of the carriage 3 for fastening the retainer plate 7A upon assembly. Thus, the use of the fastener band 46 would make assembly and dismantlement of the roller chain 5 out of the recirculation circuit 52 easier. Moreover, there is no need of making any bolt holes in the retainer plate 7A and the carriage 3. Like the retainer band 6, the fastener band 46 may be easily made by simple bending operation to form a thin metal strip into a desired shape. No need of through-holes for fastening gives an advantage to the linear motion guide unit that requires the use of tiny rolling-element chain.

For completing assembly of the slider 2, the retainer plate 7A fits into the V-groove 26 cut in the carriage 3 at an area between parallel recirculation circuits 52, and then the fastener band 46 fits over the end caps 4A to secure the retainer plate 7A against the carriage 3. The fastener band 46 includes a major part 47 to carry the retainer plate 7A thereon, lengthwise opposite ends 48 of the major part 47 bent to fit in concaves 50 made on the outside end surfaces of the end caps 4, and hooked extremities 49 to make engagement with depressions 51 made on side surfaces of the end caps 4A. The concaves 50 coming into engagement with the bent ends 48 of the fastener band 46 are cut more deeply on the end caps 4A than the slots 33 in which the retainer bands 6 fit.

With the first embodiment 1 constructed as stated earlier, the carriage 3 has to be made between the parallel races 18 with the through-holes 58 through which the bolts 14 extend into the retainer plate 7 that has correspondingly the threaded holes into which the bolts 14 fit to fasten the retainer plate 7 to the carriage 3. Making the threaded holes in the retainer plate 7, because of taking up much space for the holes, would give rise to any space constraint on the guide surfaces 45 of the retainer plate 7, and therefore are not favorable for shrinking the linear motion guide unit.

Figure 15:
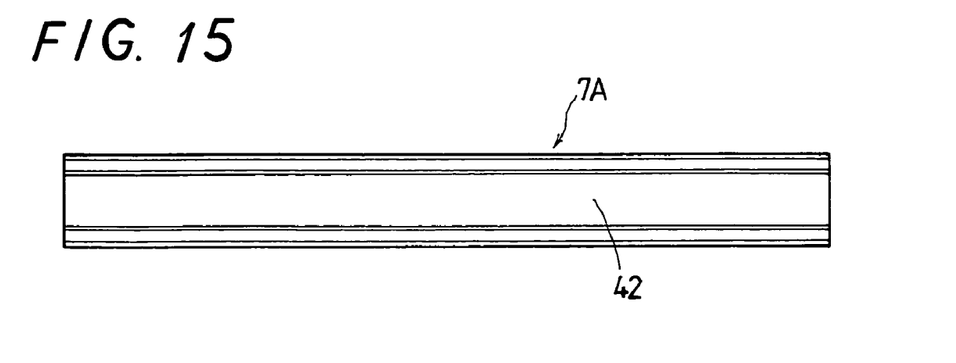
FIG. 15 is a front elevation of a version of the retainer plate, which is adapted to fit it in the linear motion guide unit of FIG. 14.
Figure 16:
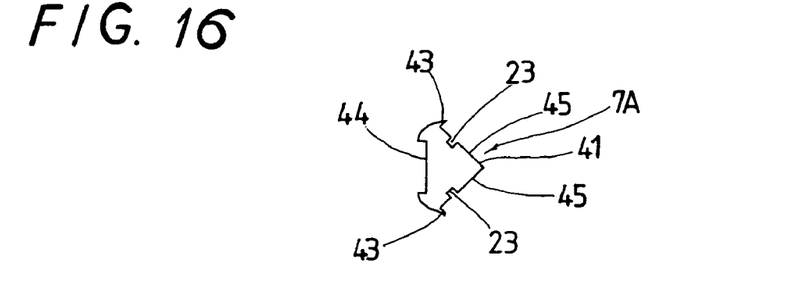
FIG. 16 is an end view of the retainer plate of FIG. 15.

To the contrary, the construction of the second embodiment has no backup plate 9 secured to the retainer plate 7A with the fastening bolts 14. Instead, the retainer plate 7A is fastened to the carriage 3 with using the fastener band 46. Thus, the retainer plate 7A, as shown in FIGS. 15 and 16, has no bores 39 that are made in the retainer plate 7 in the first embodiment as in FIG. 12, but a recess 44 to accommodate the fastener band 46 therein, the recess 44 being cut somewhat more in depth than the thickness of the fastener band 7A, but less than the depth of the recess 42 cut in the retainer plate 7 of the first embodiment.

Figure 17:
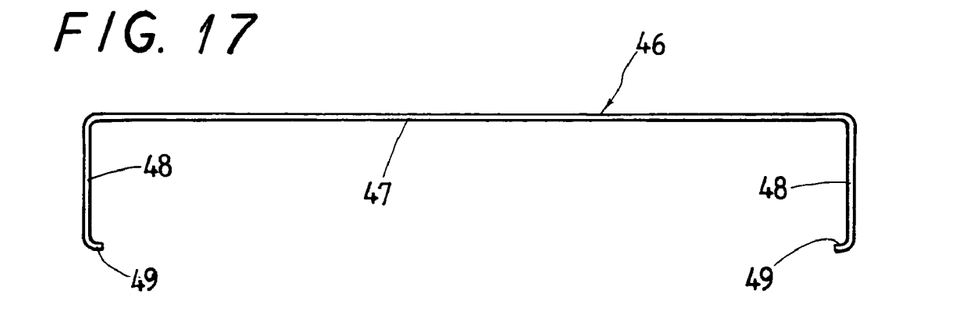
FIG. 17 is a front elevation of a fastener band to keep the retainer plate in place in the linear motion guide unit.
Figure 18:
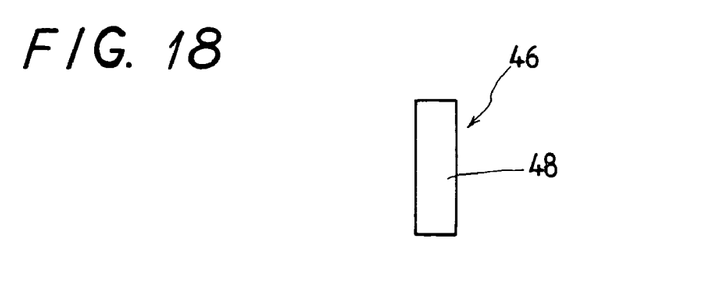
FIG. 18 is an end view of the fastener band of FIG. 17.

The fastener band 46, as seen in FIGS. 17 and 18, is made more in thickness and width, compared with the retainer band 6 (refer to FIGS. 7 and 8), which lies along the race 18. The fastener band 46 may keep the retainer plate 7A by making engagement at the opposite ends thereof with the forward and aft end caps 4A. The fastener band 46 consists of a major part 47 fit into the recess 44 in the retainer plate 7A to bear the retainer plate 7A thereon, the forward and aft ends 48 bent to make engagement with their associated end caps 4A, and hooked extremities 49 further bent to fit into the end caps 4A. As an alternative, although not shown, the fastener band 46 may be made integral with the retainer plate 7A.

Figure 19:
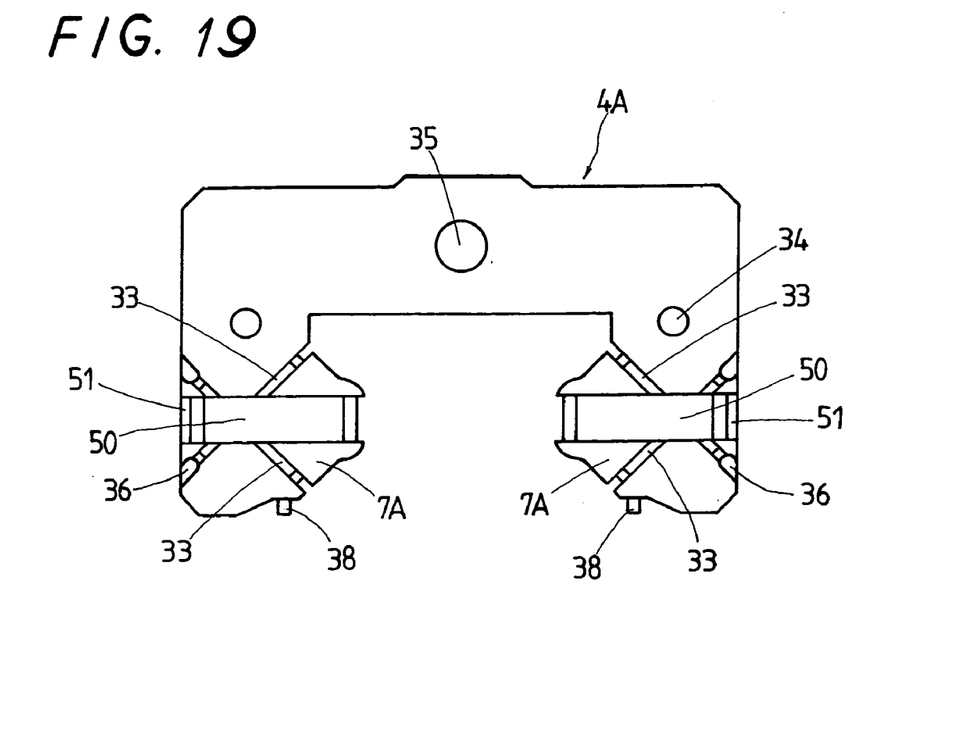
FIG. 19 is a front elevation of another version of an end cap to be assembled in the modified linear motion guide unit of FIG. 14.
Figure 20:
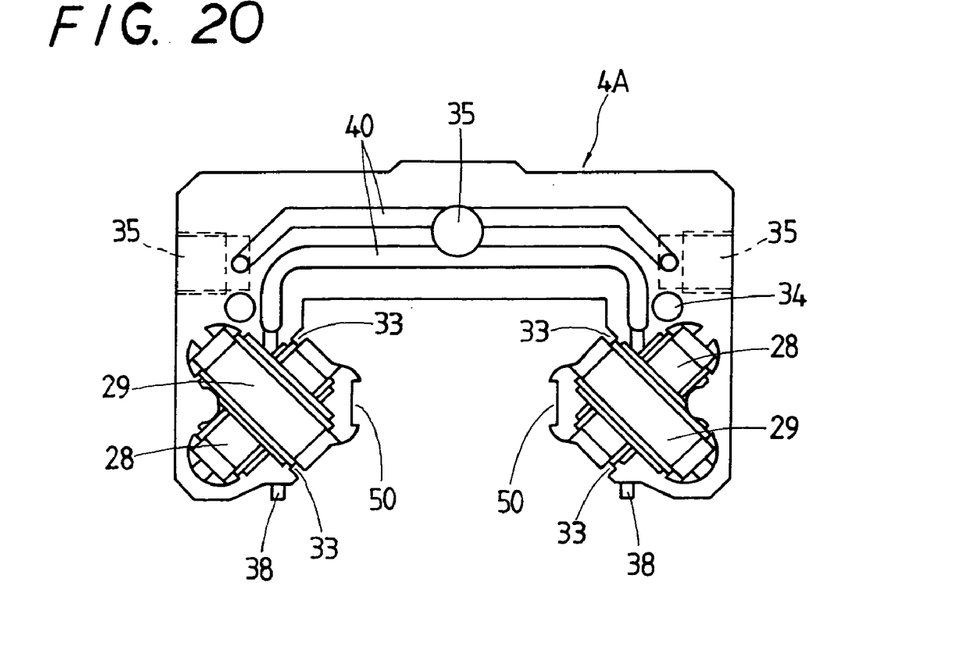
FIG. 20 is a rear view of the end cap in FIG. 19.
Figure 21:
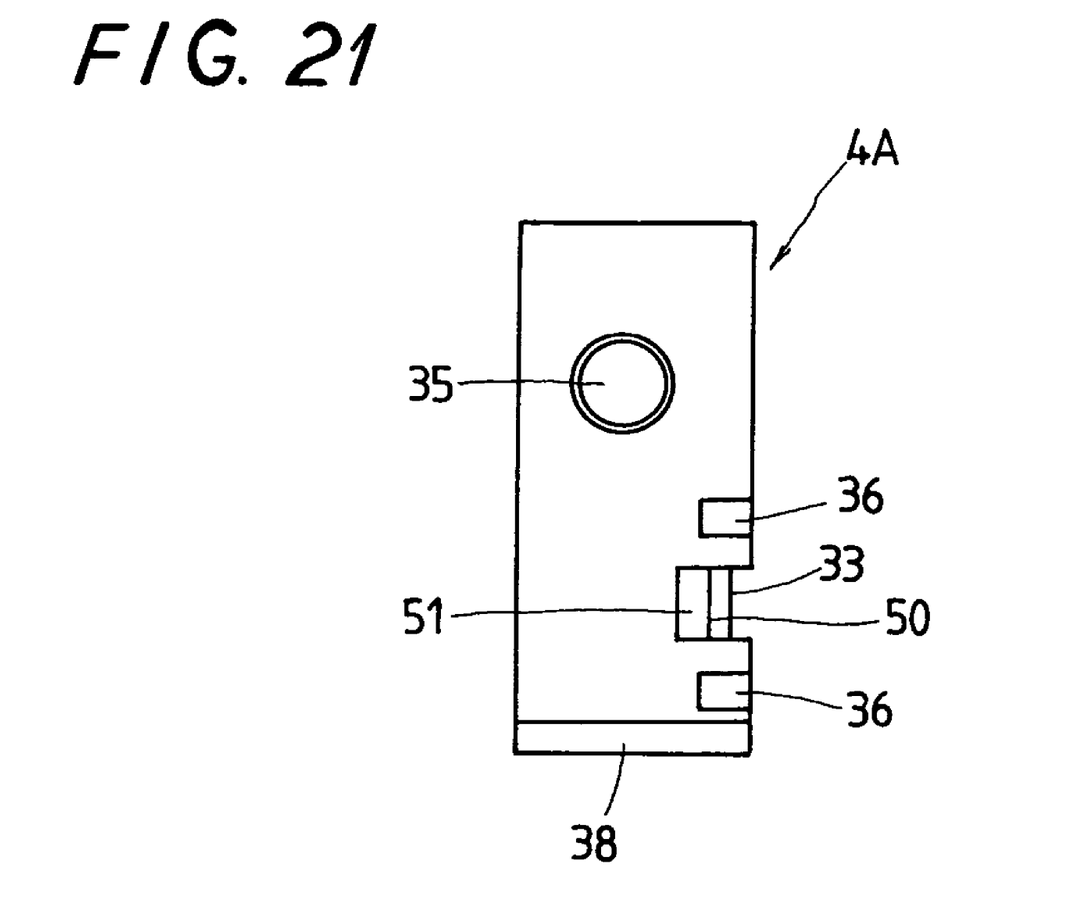
FIG. 21 is a side elevation of the end cap shown in FIG. 19.

As shown in FIGS. 19 and 21, the fastener band 46 makes engagement at the bend end 49 thereof with the associated concave 50 of the end cap 4A while at the hooked extremity 49 thereof with the associated depression 51 of the end cap 4A. The concaves 50 cut in the front face of the end cap 4A are made more in depth than the crossed slots 33 to accommodate the retainer bands 6 therein, and also made identical in depth on sidewise opposite sides on the end cap 4A. Upon assembly of the slider 2, the retainer plate 7A is first fastened to the carriage.

Assembly of the slider 2 according to the first embodiment with the retainer plate 7 will be carried out through the sequence as stated below:

1. The end caps 4 are secured to the forward and aft ends of the carriage 3, one to each end:
2. A roller chains 5 are applied to the races 18 of the double-recirculation circuits prepared in any one side block of the carriage 3:
3. The retainer plate 7 is fastened to the carriage 3 while any one of parallel link sets 22 fits in the associated guide slot 23 in the retainer plate 7:
4. The retainer bands 6 are anchored at their lengthwise ends to the end caps 4 in a way covering another link set 22:
5. Application of the roller chains 5 to the opposite double-recirculation circuits of the carriage 3 is made in the same way as stated just earlier: and
6. The end seals 11 are finally mounted on the end caps 4, finishing the assembly of the slider 2.

With the second embodiment of the construction in which the fastener band 46 is selected to keep the retainer plate 7A in place, the assembly of the slider 2 would be even easier because there is no need of forcing the fastening bolts 14 from any outside surface of the carriage 3.

What is claimed is:

1. A linear motion guide unit comprising; an elongated guide rail, a slider arranged on the guide rail for movement relative to the guide rail, a rolling element rolling through a recirculation circuit made in the slider, a rolling-element chain allowed to travel together with the rolling element through the recirculation circuit, and a first retainer band to guide the rolling-element chain along a load area in the recirculation circuit defined between the guide rail and the slider while keeping the rolling-element chain against running out of line; and wherein the first retainer band is installed in the slider in a detachable way allowing the rolling-element chain to fit it into the recirculation circuit from the load area of the recirculation circuit.

2. A linear motion guide unit constructed as defined in claim 1, wherein the rolling-element chain is comprised of a retainer including a separator interposed between any two adjoining rolling elements to keep the adjoining rolling elements against rolling contact with one another while keeping the rolling elements against running out of line and a set of parallel resilient links interconnecting in series the adjoining separators with one another, and the rolling element fit in an opening defined by both the adjoining separators and the links interconnecting the separators of the retainer.

3. A linear motion guide unit constructed as defined in claim 1, wherein the slider is composed of a carriage having a race to form the load area together with a race of the guide rail between them, and a return passage to return the rolling element from any one of forward and aft ends of the load area back to other end, and end caps secured to forward and aft ends of the carriage, one to each end, and made therein with turnarounds where the rolling-element chain is allowed to turn about in rolling direction, and wherein the recirculation circuit is make up of the load area, return passage and turnaround.

4. A linear motion guide unit constructed as defined in claim 3, wherein one of the parallel links of the rolling-element chain fits for traveling in a guide trough that is defined in the load area of the recirculation circuit between the retainer band and a guide shoulder cut in the carriage, while another of the parallel links of the rolling-element chain fits for traveling in another guide trough that is cut in a retainer plate secured to the carriage.

5. A linear motion guide unit constructed as defined in claim 4, wherein the retainer plate has a wedge on a surface thereof facing the carriage, a recess on a surface thereof opposite to the wedged surface, and a bore to allow a fastening bolt extend through there after having extended through a bolt hole in the carriage, the wedge being adapted to fit into a V-groove cut in any one side block of the carriage between two rows of the circulation circuits, the recess being adapted to accommodate therein a backup plate with a threaded hole, whereby the retainer plate is secured to the carriage by fitting the wedge into the V-groove, followed by screwing the fastening bolt into the threaded hole in the backup plate.

6. A linear motion guide unit constructed as defined in claim 4, wherein the retainer plate has a wedge on a surface thereof facing the carriage, a recess on a surface thereof opposite to the wedged surface, the wedge being adapted to fit into a V-groove cut in any one side block of the carriage between two rows of the circulation circuits, and wherein a fastener band is provided to fit into the recess with lengthwise opposite ends thereof coming into engagement with the forward and aft end caps whereby the retainer plate is secured to the carriage.

7. A linear motion guide unit constructed as defined in claim 6, wherein the fastener band is composed of a major part to bear the retainer plate thereon, forward and aft ends bent to make engagement with concaves cut in the end caps, and hooked extremities to fit into depressions cut in sides of the end caps, the concaves in the end cap being made more in depth than the slots that are cut to accommodate the retainer band, which is to keep the one of the parallel links of the rolling-element chain against running out of line.

8. A linear motion guide unit constructed as defined in claim 3, wherein the return passage of the recirculation circuit in the carriage is formed within a sleeve installed in a bore in the carriage, the sleeve having a guide slot cut deep to allow the link of the roller chain to move along there.

9. A linear motion guide unit constructed as defined in claim 1, wherein the retainer band is made of a metal strip bent to a specific shape, which includes a major retainer part to guide the link to keep it against running out of line, lengthwise opposite ends of the major retainer part bent to make engagement with slots cut in end surfaces of the end caps, and hooked toes at the extremities of the bent ends to come into engagement with dents cut in sides of the end caps.

10. A linear motion guide unit constructed as defined in claim 9, wherein the recirculation circuits are arranged on sidewise paired side blocks of the carriage, two rows for each side, the two rows of the recirculation circuits being oriented to intersect each other, and the slots to make engagement with the retainer band are cut in the end surfaces of the end caps in a way that they are different in depth and crossed each other.

11. A linear motion guide unit constructed as defined in claim 10, wherein the rolling-element chains are roller chains in which rolling elements are rollers, the roller chains being installed in the two rows of the recirculation circuits, one to each row.

12. A linear motion guide unit constructed as defined in claim 11, wherein the retainer plate has lengthwise guide surfaces to guide any axial ends of the rollers in the recirculation circuits, the guide surfaces being made therein with guide troughs for carrying another of the parallel links of the roller chain.

* * * * *